United States Patent [19]

Scobbo, Jr. et al.

[11] Patent Number: 5,334,659
[45] Date of Patent: Aug. 2, 1994

[54] ELASTOMERIC BLENDS AND METHOD FOR THEIR PREPARATION

[75] Inventors: James J. Scobbo, Jr., Guilderland; Gregory J. Stoddard, Schenectady, both of N.Y.

[73] Assignee: General Electric Company, Schenectady, N.Y.

[21] Appl. No.: 66,289

[22] Filed: May 24, 1993

Related U.S. Application Data

[63] Continuation-in-part of Ser. No. 33,208, Mar. 18, 1993, abandoned.

[51] Int. Cl.$^5$ .............................................. C08L 51/04
[52] U.S. Cl. .......................................... 525/71; 525/74; 525/75; 525/77; 525/197
[58] Field of Search .................... 525/71, 74, 75, 77, 525/197

[56] References Cited

U.S. PATENT DOCUMENTS

| | | | |
|---|---|---|---|
| 4,060,689 | 11/1977 | Harris | 560/29 |
| 4,097,549 | 6/1978 | Kruse | 525/86 |
| 4,542,179 | 9/1985 | Falk et al. | 524/432 |
| 4,977,049 | 12/1990 | Kato | 430/49 |
| 5,068,284 | 11/1991 | Ullman et al. | 525/67 |
| 5,124,410 | 6/1992 | Campbell | 525/293 |
| 5,212,240 | 5/1983 | Dion et al. | 525/86 |
| 5,225,483 | 7/1993 | Datta et al. | 525/73 |

OTHER PUBLICATIONS

Finkenaur et al., Polymer Preprints (ACS) 23,91–2 (1982).
Chien et al., Journal of Polymer Science; Polymer Chemistry Edition, 23, 2247–2254 (1985).

*Primary Examiner*—Mark Nagumo
*Attorney, Agent, or Firm*—William H. Pittman

[57] ABSTRACT

Copolymer compositions useful as impact modifiers are prepared by blending, under reactive conditions, at least one functionalized addition polymer with an excess of at least one functionalized elastomer reactive therewith to form a preblend, and subsequently blending said preblend, under reactive conditions, with a further amount of at least one functionalized addition polymer. The preferred addition polymers and elastomers are carbamate-functionalized styrene-acrylonitrile copolymers and maleic anhydride-grafted EPDM elastomers, respectively. The product of the two-step blending operation is a composition comprising a continuous addition polymer phase and elastomer particles dispersed therein, said elastomer particles containing occluded addition polymer. Said composition is stabilized by copolymer formation between the elastomer particles and the addition polymer.

8 Claims, No Drawings

ELASTOMERIC BLENDS AND METHOD FOR THEIR PREPARATION

This application is a continuation-in-part of copending application Ser. No. 08/033,208 filed Mar. 14, 1993, now abandoned.

This invention relates to thermoplastic compositions. More particularly, it relates to the preparation of copolymer compositions in a novel physical form, said copolymer compositions being capable of employment as impact modifiers for a wide variety of thermoplastic polymers.

The incorporation of elastomeric impact modifiers in thermoplastic polymers to increase the impact strength thereof has been known for some time. The polymers in which the impact modifiers are incorporated constitute a wide variety; examples are olefin polymers, styrene-acrylonitrile copolymers, polycarbonates and polyphenylene ethers.

Various types of elastomeric impact modifiers are employed in combination with such polymers. Their identity depends in large part on that of the polymer being modified. For example, styrene-acrylonitrile copolymers (hereinafter sometimes "SAN copolymers") are frequently modified with elastomeric copolymers of ethylene, a $C_{3-8}$ monoolefin and a non-conjugated diene. Most often, the $C_{3-8}$ monoolefin is propylene and the elastomers are termed "EPDM elastomers". Suitable impact modifiers for polycarbonates include styrene-alkyl (meth)acrylate copolymers. For polyphenylene ethers, block copolymers of styrene and conjugated dienes such as butadiene or isoprene may be employed, as may high impact polystyrenes, the latter comprising a continuous phase of polystyrene with polybutadiene particles containing occluded polystyrene dispersed therein.

In recent years, functionalized polymer blends have become increasingly important since they provide a route to compatibilized materials formed from normally incompatible polymers. For example, polyethylene ethers are incompatible with polyamides and linear polyesters unless the latter are present in very small proportions, but a polyphenylene ether containing functional groups reactive with the amine or carboxy end groups of polyamides or the carboxy end groups of polyesters can form a copolymer therewith and said copolymer is effective as a compatibilizer in a blend of the polyphenylene ether and the polyamide or polyester.

Similarly, the aforementioned copending application Ser. No. 08/033,208 (now abandoned) describes the preparation of carbamate-functionalized SAN copolymers which, when heated, release carbon dioxide and olefin to produce amine-functionalized copolymers. The latter can undergo reaction with acid- or acid derivative-functionalized EPDM elastomers to form highly compatible copolymers of styrene, acrylonitrile and EPDM which are useful as impact modifiers for SAN copolymers.

The present invention is based on the discovery of a method for preparing highly compatible blends of functionalized addition polymers and functionalized elastomers, said blends containing dispersed elastomer particles having a substantial proportion of occluded addition polymer therein. It is further based on the discovery that such blends are unusually effective as impact modifiers for thermoplastic polymers in general. When so employed, they frequently impart substantially higher impact strength to said thermoplastic polymers than do impact modifiers lacking the occluded addition polymer in the elastomeric phase.

In one of its aspects, the invention is a method for preparing a copolymer composition which comprises:

blending, under reactive conditions, at least one functionalized addition polymer with an excess of at least one functionalized elastomer reactive therewith, to form an elastomeric preblend; and blending, under reactive conditions, said elastomeric preblend with a further amount of at least one functionalized addition polymer reactive with said functionalized elastomer.

Elastomers which may be functionalized and employed in the present invention include copolymers comprising units derived from conjugated dienes such as butadiene, isoprene and chloroprene. Also present may be units derived from other monomers such as esters of unsaturated carboxylic acids as illustrated by alkyl (meth)acrylates, alkenylaromatic compounds as illustrated by styrene, and olefins as illustrated by ethylene and $C_{3-8}$ monoolefins such as propylene. Non-conjugated dienes such as 5-ethylidene-2-norbornene, 1,4-hexadiene and dicyclopentadiene may be employed in combination therewith. EPDM elastomers are particularly suitable, especially those which have a glass transition temperature less than about 0° C. and preferably less than about −20° C.

The functionalized addition polymers employed according to the invention may be derived from a wide variety of monomers. They include unsaturated alcohols and esters thereof such as allyl alcohol and vinyl acetate; unsaturated acids and their functional derivatives such as acrylic, methacrylic and maleic acids, ethyl acrylate, methyl methacrylate, maleic anhydride, acrylamide, methacrylamide and acrylonitrile; vinyl cyclic compounds such as styrene; unsaturated ethers such as methyl vinyl ether; unsaturated ketones such as methyl vinyl ketone; unsaturated aliphatic hydrocarbons such as ethylene and propylene; and unsaturated alkyl halides such as vinyl chloride and vinylidene chloride. SAN copolymers are often preferred.

Both the addition polymer and the elastomer must be functionalized for employment in the present invention. The elastomer generally contains copolymerized or grafted acidic, preferably carboxylic acid, groups or functional derivatives thereof derived from, for example, acrylic acid, methacrylic acid or maleic anhydride which are capable of reaction with acid-reactive functional groups on the addition polymer. In many instances, the preferred functionalized elastomers are maleic anhydride-grafted EPDM elastomers. It is also contemplated, however, for the functional groups on the elastomer to be acid-reactive and those on the addition polymer to be acidic. The acid-reactive groups on the addition polymer are typically amine groups or, preferably, protected amine (e.g., carbamate) groups.

Among the carbamate-functionalized addition polymers and copolymers which may be employed in the method of this invention are those having the formula

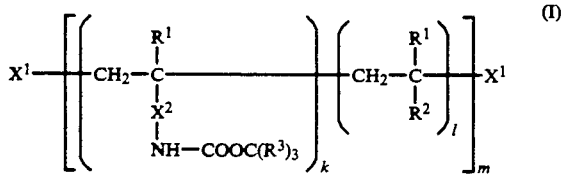

wherein:
- each $R^1$ is independently hydrogen or $C_{1-5}$ alkyl, preferably hydrogen or methyl;
- each $R^2$ is independently aryl or alkaryl of 1 to 20 carbon atoms; an ester of 1 to 20 carbon atoms, including ester groups such as methoxycarbonyl, ethoxycarbonyl, propoxycarbonyl and butoxycarbonyl; alkoxy of 1 to 20 carbon atoms; acetoxy; or cyano;
- each $R^3$ is independently a $C_{1-10}$ hydrocarbyl moiety, such as alkyl, phenyl or substituted phenyl, provided that at least one $R^3$ is alkyl;
- $X^2$ is

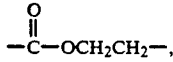

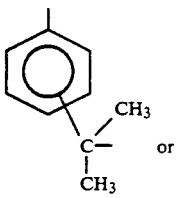

or

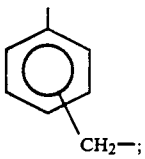

k is an integer in the range from 1 to about 1000;
l is 0 or an integer from 1 to about 4000, and k and l may vary independently from unit to unit;
m is an integer from 1 to about 100 and represents the number of carbamate-functionalized monomer and comonomer alternations when l is 1 or greater; and
$X^1$ is a chain terminating group, such as hydrogen, alkyl, alkoxy, aryl, acyloxy, or alkylthio.

More preferably, l is 1 or greater, and the addition polymer is a copolymer wherein $R^2$ is aryl, alkaryl and/or cyano. Even more preferably, $R^2$ is phenyl or cyano, and the k divalent units are derived from N-t-hydrocarbyloxycarbonyl-2-aminoethyl · acrylates, {1-methyl-1-[3-(1-methylethenyl)phenyl]ethyl}carbamic acid t-alkyl or t-aralkyl esters, or N-t-hydrocarbyloxycarbonyl-m,p-vinylbenzylamines. Most preferably, the k divalent units are derived from N-t-butoxycarbonyl-2-aminoethyl acrylate {1-methyl-1-[3-(1-methylethenyl)-phenyl]ethyl}carbamic acid 1,1-dimethylethyl ester, or N-t-butoxycarbonyl-m,p-vinylbenzylamine.

Carbamate-functionalized vinyl monomers suitable for forming addition polymers and copolymers can be prepared in a variety of ways. These are illustrated by the reaction of isocyanate-substituted vinyl monomers with tertiary alcohols, the reaction of amine-substituted vinyl monomers with di(t-alkyl dicarbonates) to form carbamates and the reaction of aminoalkanols with di-(t-alkyl dicarbonates) to yield intermediates which then undergo reaction with (meth)acryloyl chloride. Preferred carbamate-functionalized vinyl monomers include N-t-alkoxycarbonyl-2-aminoethyl acrylates, {1-methyl-1-[3-(1-methylethenyl)phenyl]ethyl}carbamic acid t-alkyl or t-aralkyl esters and N-t-hydrocarbyloxycarbonyl-m,p-vinylbenzylamines.

The proportions of functionalized structural units in the functionalized addition polymer and elastomer are usually at least about 0.5 and preferably about 0.5–5.0 mole percent of each polymer.

The preparation of carbamate-functionalized addition polymers useful in the method of this invention is illustrated by the following examples.

EXAMPLE 1

A solution comprising 2-aminoethanol (183 g; 3.00 mol) and tetrahydrofuran (THF, 1 L) and a second solution comprising di-t-butyl dicarbonate (652 g, 2.98 mol) and THF (1 L) were pumped at room temperature and at equal rates (about 5.6 mL/min) into a 5 liter, three-necked flask containing THF (2 L). Over the course of 3 hr, gas evolution was observed and the temperature rose from 24° C. to 64° C. The reaction mixture was then concentrated on a rotary evaporator and vacuum dried for 1 hr at 150 millitorr. A light yellow oil was obtained. For identification purposes, a sample of the oil was purified via flash chromatography on 230–400 mesh silica using a 5/1 solution of hexanes to diethyl ether. The purified oil was identified by proton and carbon-13 nuclear magnetic resonance (NMR) spectroscopy as N-t-butoxycarbonyl-2-aminoethanol.

Crude N-t-butoxycarbonyl-2-aminoethanol (633 g) was diluted with THF (1 L). Likewise, acryloyl chloride (315 g, 3.48 mol) was added to enough THF to make a 1 liter solution. The two solutions were pumped at equal rates over a 2.5 hr period into a 5 L, three-necked flask containing THF (1.5 L) and pyridine (275 g, 3.48 mol). The reaction mixture exothermed over 2.5 hr, and was then cooled and concentrated on a rotary evaporator. The crude, yellow crystalline material which was obtained was purified by recrystallization at 0° C. using a solution of 5:1 hexanes to diethyl ether to yield a white crystalline solid (mp 54°–56° C.). Purification via flash chromatography using 230–400 mesh silica and a 10:1 solution of hexanes to diethyl ether gave N-t-butoxycarbonyl-2-aminoethyl acrylate, also as shown by proton and carbon-13 NMR spectroscopy.

Into a 5 liter, three neck, round bottomed flask equipped with a condenser, mechanical stirrer and thermometer were placed styrene (800 mL, 6.93 mol), acrylonitrile (300 mL, 4.56 mol), N-t-butoxycarbonyl-2-aminoethyl acrylate 24.9 g, 115 mmol), AIBN (3.83 g, 23.3 mmol), and methyl ethyl ketone (1.5 L). The mixture was purged with nitrogen for five minutes followed by stirring at 70° C. for 24 hr. The viscous solution was cooled and precipitated into methanol with mechanical agitation. The polymer was isolated by filtration, washed with methanol, and dried in a vacuum oven at 60° C. for 48 hr. A carbamate-functionalized addition copolymer (795 g) was produced in 80 percent isolated yield, as shown by infrared and carbon-13 NMR spectroscopy.

Extrusion of said copolymer at 230° C. afforded a material which no longer displayed the t-butyl resonance in the carbon-13 NMR spectrum. Also, the carbamate carbonyl peak in the infrared spectrum essentially disappeared. These observations, confirmed by thermogravimetric analysis/mass spectrometry, demonstrate that at high temperature the carbamate functionalities decompose, presumably releasing isobutylene and carbon dioxide and leaving an unprotected amine functionality in the polymer.

EXAMPLE 2

Distilled water (1000 g), ferrous sulfate heptahydrate (50 mg, 0.179 mmol), and sulfuric acid (2 drops, $pH_{reaction}=3.5–4.5$) were charged to a 3 L jacketed reaction flask. A styrene solution was made by mixing styrene (98%, 763.6 g, 7.33 mol), t-dodecyl mercaptan (3.94 g, 19.5 mmol) and N-t-butoxycarbonyl-2-aminoethyl acrylate (26.1 g, 121 mmol), prepared hereinabove in Example 1. This styrene solution (746.2 g), acrylonitrile (4.55 mol, 241.4 g), sodium formaldehyde sulfoxylate (8 g in 120.0 g total aqueous solution, pump rate 5.0 g/10 min), sodium dodecylbenzene sulfonate (3.0 g in 630 g total aqueous solution, pump rate 16 g/10 min), and t-butyl hydroperoxide (90%, 69.9 mmol, 10.0 g in 120.0 g total aqueous solution, pump rate 5.0 g/10 min) were added via independent feed lines over 150 minutes time. The temperature rose within the reaction flask from 15° C. to 45° C. during 150 min of reaction time. A latex polymer was produced having a particle size of 380 nm (Dv=564 nm, Dn=379 nm by Nicomp 370 light scattering).

The contents of the reactor were then poured into a stainless steel beaker containing calcium chloride (30 g) and distilled water (2000 L). The resulting coagulum was filtered by centrifugation and dried in a vacuum oven for 48 hr at 60° C. The dried material was ground into a powder utilizing a polymer grinder and redried in a vacuum oven for 10 hr at 40° C. to yield a carbamate-functionalized addition polymer. Verification that the butoxycarbamate functionality survived the polymerization conditions was made by Fourier transform infrared (FTIR) spectroscopy on cast films and by carbon-13 NMR spectroscopy.

EXAMPLE 3

Into a 3-neck, 10 L round bottom flask equipped with a mechanical stirrer, condenser, and a nitrogen inlet was placed α,α-dimethyl-m-isopropenylbenzyl isocyanate (1083 g, 5.38 mol), hexane (6L), and t-butyl alcohol (398.8 g, 5.38 mol). While the mixture was stirred at room temperature, potassium t-butoxide (18.0 g, 160 mmol) was added in portions. Throughout the addition the reaction temperature increased to 50° C. The reaction was complete within an hour. The reaction mixture was washed with water (5L), and thereafter, the organics were separated from the aqueous layer. The organics were dried over magnesium sulfate, filtered, and evaporated to yield a yellow-brown semi-solid. Recrystallization from hexane afforded essentially pure {1-methyl-1-[3-(1-methylethenyl)phenyl]ethyl}carbamic acid 1,1-dimethylethyl ester (1193 g, 81% isolated yield), as shown by proton and carbon-13 NMR spectroscopy.

A 5 L flask equipped with a mechanical stirrer, condenser, and a temperature probe was charged with 2800 mL water and polyvinylpyrrolidone (PVP, 2.30 g). To this stirred solution was added styrene (746 mL, 6.51 mol), acrylonitrile (370 mL, 7.18 mol), t-dodecyl mercaptan (4.18 g, 20.7 mmol), AIBN (1.30 g, 7.92 mmol), and {1-methyl-1-[3-(1-methylethenyl)phenyl]ethyl}carbamic acid 1,1-dimethylethyl ester (37,18 g, 0.135 mol).

The mixture was stirred vigorously (500 rpm) and heated to 73° C. After 5 hr, the reaction was cooled to room temperature with continued stirring. The suspension was filtered by centrifugation, and the solids were washed extensively with methanol. The beads obtained were dried in a vacuum oven for 24 hr at 60° C. to provide a carbamate-functionalized addition copolymer (947 g, 86% yield). FTIR spectroscopy confirmed the presence of carbamate functionality.

EXAMPLE 4

Into a 1 L round bottom flask were placed vinylbenzyl chloride (100 g, 655 mmol), dimethylformamide (500 mL), and sodium azide (42.6 g, 655 mmol). The mixture was stirred at room temperature for 24 hr. Diethyl ether (500 mL) was added and the mixture was extracted with water (300 mL). The organic layer was re-extracted with water (300 mL). The combined aqueous layers were extracted with ether (500 mL). The organic layers were combined, dried over magnesium sulfate, filtered, and evaporated to yield a light yellow oil (105 g, about 100% yield) identified as vinylbenzyl azide.

Into a 5 L, 3-neck round bottom flask equipped with a mechanical stirrer, condenser, and an addition funnel were placed lithium aluminum hydride (28.6 g, 754 mmol) and ether (2400 mL). This mixture was stirred at room temperature while a solution of the vinylbenzyl azide (79.2 g, 498 mmol) in ether (300 mL) was added dropwise. Gentle reflux was maintained after a slight induction period. The reaction was monitored by thin layer chromatography (ether:hexane 1:1). The reaction was over after about 4 hr. Water (150 mL) was carefully added followed by 1M sodium hydroxide (300 mL). The mixture was separated and the aqueous layer was extracted with ether (500 mL) twice. The combined organics were dried over magnesium sulfate, filtered, and evaporated to provide a light yellow oil (46.2, g, 70% yield) identified as a mixture of m- and p-vinylbenzylamine.

A solution of the vinylbenzylamine mixture (46.2 g, 347 mmol) in THF (200 mL) and a second solution of di-t-butyl dicarbonate (75.7 g, 347 mmol) in THF (200 mL) were pumped at equal rates (ca. 1.0 mL/min) at room temperature into a 5 L, 3-neck flask containing THF (400 mL). Over the course of 3 hr, gas evolution was observed. The reaction was concentrated on a rotary evaporator followed by vacuum drying at 150 millitorr for 1 hr. The resulting viscous material was columned on silica (230–400 mesh) with hexanes as the eluent to provide a light yellow oil identified as N-t-butoxycarbonyl-m,p-vinyl-benzylamine (62.7 g, 77% isolated yield).

Into a 5 L, 3 neck, round bottom flask equipped with a condenser, mechanical stirrer, and thermometer were added styrene (800 mL, 6.98 mol), acrylonitrile (300 mL, 4.56 mol), N-t-butoxycarbonyl-m,p-vinyl benzylamine (26.92 g, 115 mmol) prepared hereinabove, AIBN (3.83 g, 23.3 mmol), and methyl ethyl ketone (MEK, 1.5 L). The mixture was purged with nitrogen for five minutes and then stirred at 70° C. for 24 hr. The viscous solution was cooled and precipitated into methanol, using mechanical agitation. The resulting carbamate-functionalized addition copolymer (as confirmed by carbon-13 NMR and FTIR spectroscopy) was isolated by filtration, washed with methanol and dried in a vacuum oven for 48 hr at 60° C. Isolated yield 761 g, 76%).

In the first step of the method of this invention, the functionalized addition polymer is blended under reactive conditions with an excess of the functionalized elastomer. Typically, the weight ratio of functionalized elastomer to functionalized addition polymer in this step is in the range of about 2-10:1.

Blending may be in solution or in the melt, provided the blending temperature is high enough to promote reaction of the functionalized addition polymer with the functionalized elastomer. Melt blending, typically at temperatures in the range of about 170°-350° C. and preferably about 200°-260° C., is generally preferred. Typical melt blending techniques include batch reactions in a Helicone reactor or Brabender melt mixer and continuous extrusion through a single or twin screw extruder.

During the blending operation the carbamate groups, if present, undergo thermal degradation with the elimination of tertiary olefin and carbon dioxide, to yield amine-substituted addition polymer. Said polymer then undergoes reaction with the functionalized elastomer to form copolymer molecules, which promote formation of a highly compatible elastomeric preblend comprising small compatibilized particles of the addition polymer in a continuous elastomer phase. A parallel reaction takes place in the case of other types of functionalization of the addition polymer and elastomer.

In the second step, said preblend is blended with a further amount of at least one functionalized addition polymer reactive with the functionalized elastomer. The addition polymer employed in this step is usually the same as that employed in the first step, although it is within the scope of the invention to employ a different functionalized addition polymer.

Blending conditions in the second step may be identical or similar to those in the first. A second extrusion is preferably performed. However, it is within the scope of the invention to introduce the additional portion of functionalized addition polymer at a downstream port of the same extruder employed in the preparation of the preblend.

The weight ratio of further functionalized addition polymer to preblend in the second step is generally about 0.3-2.0:1. Preferably, an amount of functionalized addition polymer to produce a final weight ratio in the range of about 0.5-1.5:1, preferably about 1:1, in the product is employed.

The second blending step has been found to cause a phase inversion, whereby the newly added addition polymer becomes the continuous phase. The elastomeric particles in the preblend become the dispersed phase, which contains occluded particles of addition polymer introduced in the first step. This composite structure has been confirmed by transmission electron microscopy. Further copolymer formation also takes place, with the result again being a highly compatible composition.

Accordingly, another aspect of the invention is a copolymer composition prepared by the above-described method, said composition comprising a continuous addition polymer phase having dispersed therein elastomer particles containing occluded addition polymer and said composition being stabilized by copolymer formation between the elastomer particles and the addition polymer in the occluded and continuous phases.

The copolymer compositions of this invention are useful as impact modifiers for thermoplastic copolymers, such as SAN. Another aspect of the invention, therefore, is resinous compositions comprising at least one thermoplastic polymer and an impact-modifying proportion of said copolymer composition. Said thermoplastic polymer is typically an unfunctionalized addition polymer similar to that employed as described hereinabove.

For example, the copolymer composition may be dry mixed with a thermoplastic polymer, and the resulting mixture may be extruded at a temperature in the range of about 170°-290° C. to form a resinous composition of the invention. Typically, the proportion of copolymer composition therein is about 10-70% and preferably about 30-50% by weight. The incorporation of SAN-EPDM copolymer compositions of the invention in SAN in this manner results in poly(acrylonitrile-EPDM-styrene) (AES) blends having improved physical properties when compared with corresponding simple blends, or with blends containing SAN-EPDM copolymers not having occluded SAN therein.

The invention is illustrated by the following examples. All parts and percentages are by weight unless otherwise indicated.

EXAMPLES 5-6

The EPDM material employed was 10% low density polyethylene and 90% of a copolymer of 71% ethylene, 24.5% propylene and 4.5% 5-ethylidene-2-norbornene units, sold under the trade name "Epsyn 801". One thousand grams thereof was tumble blended with finely ground maleic anhydride (20 g) and dicumyl peroxide (1 g) for 30 min. The mixture was extruded on a Welding Engineers 20-mm. twin screw extruder set to 400 rpm at temperatures in the range of 120°-205° C. The feed rate was gradually increased to afford maximum throughput which yielded a torque reading of 9 amps. The extrudate was cooled in a water bath and chopped into pellets. The pellets were dried in a vacuum oven at 60° C. for 24 hr. Analysis by FTIR spectroscopy using succinic anhydride/EPDM mixtures to form a calibration curve indicated that half of the maleic anhydride was present in the extrudate. Multiple precipitations of the EPDM-MA from hot toluene into methanol followed by FTIR analysis indicated that over 95 percent of the maleic anhydride was chemically bonded to the EPDM.

Twenty parts of the carbamate-functionalized addition polymers of Examples 1 and 3 (respectively) were tumble blended with 80 parts of the maleic anhydride-grafted EPDM rubber and extruded at 232° C. The resulting preblend extrudates were cooled in a water bath, pelletized and dried. Further blends were prepared from 62.5 parts of each preblend and 37.5 parts of the corresponding carbamate-functionalized addition polymer and extruded in the same manner.

The products were examined by transmission electron microscopy. They were found to constitute a continuous SAN phase with EPDM domains dispersed therein, said EPDM domains further containing substantial proportions of occluded SAN.

EXAMPLES 7-8

Mixtures of 50 parts of commercially available SAN containing 72% styrene and 28% acrylonitrile units and 50 parts of the copolymers of examples 5-6 as impact modifiers were extruded under the extrusion conditions of Example 5. The compositions and physical properties of the extruded blends are set forth in the following table, in comparison with a control employing an impact modifier similar to the product of Example 5 except that blending was done in a single step.

| Example | Impact mod. | Notched Izod impact strength, joules/m. | % elongation |
|---|---|---|---|
| 7 | 5 | 529 | 19.0 |
| 8 | 6 | 384 | 18.4 |
| Control | Control | 176 | 16.5 |

It is apparent from a comparison of Example 7 with the control that the compositions of this invention have substantially higher impact strengths than those in which the impact modifier was prepared by a single blending operation. Elongation values are comparable but are somewhat higher for the compositions of the invention.

What is claimed is:

1. A resinous composition comprising:
   at least one thermoplastic polymer, and
   an impact modifying proportion of a copolymer composition prepared by:
   blending in a first step, under reactive conditions, at least one carbamate-functionalized addition polymer having the formula

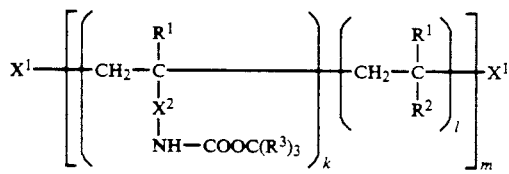

wherein:
   each $R^1$ is independently hydrogen or $C_{1-5}$ alkyl;
   each $R^2$ is independently aryl or alkaryl of 1 to 20 carbon atoms; an ester group of 1 to 20 carbon atoms; alkoxy of 1 to 20 carbon atoms; acetoxy; or cyano;
   each $R^3$ is independently a $C_{1-10}$ hydrocarbyl moiety, provided that at least one $R^3$ is alkyl;
   $X^2$ is

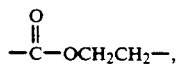

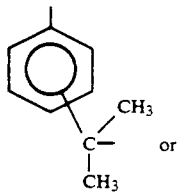

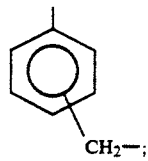

$k$ is an integer in the range from 1 to about 1000;
   $l$ is 0 or an integer from 1 to about 4000, and $k$ and $l$ may vary independently from unit to unit;
   $m$ is an integer from 1 to about 100 and represents the number of carbamate-functionalized monomer and comonomer alternations when $l$ is 1 or greater; and
   $X^1$ is a chain terminating group;
   with an excess of at least one functionalized elastomer reactive therewith, to form an elastomeric preblend; and
   blending in a second step, under reactive conditions, said elastomeric preblend with a further amount of at least one functionalized addition polymer reactive with said functionalized elastomer;
   said copolymer composition comprising a continuous addition polymer phase having dispersed therein elastomer particles containing occluded addition polymer and being stabilized by copolymer formation between the elastomer particles and the addition polymer in the occluded and continuous phases.

2. A composition according to claim 1, wherein the thermoplastic polymer is a styrene-acrylonitrile copolymer.

3. A composition according to claim 1 wherein the functionalized elastomer is a copolymer of ethylene, a $C_{3-8}$ monoolefin and a non-conjugated diene containing carboxylic acid groups.

4. A composition according to claim 1 wherein each functionalized addition polymer is a styrene-acrylonitrile copolymer and the functionalized elastomer is a maleic anhydride-grafted EPDM elastomer.

5. A composition according to claim 1 wherein each functionalized addition polymer is a styrene-acrylonitrile copolymer containing structural units derived by addition polymerization from an N-t-hydrocarbyloxycarbonyl-2-aminoethyl acrylate, a {1-methyl-1-[3-(1-methylethenyl)phenyl]ethyl}carbamic acid t-alkyl or t-aralkyl ester or an N-t-hydrocarbyloxycarbonyl-m,p-vinylbenzylamine.

6. A composition according to claim 1 wherein the weight ratio of functionalized elastomer to functionalized addition polymer in the first step is in the range of about 2–10:1.

7. A composition according to claim 1 wherein the weight ratio of further functionalized addition polymer to preblend in the second step is about 0.3–2.0:1.

8. A composition according to claim 1 wherein an amount of functionalized addition polymer to produce a final weight ratio in the range of about 0.5–1.5:1 in the product is employed in the second step.

* * * * *